United States Patent
Orlandi

(10) Patent No.: US 7,547,988 B2
(45) Date of Patent: Jun. 16, 2009

(54) RAILWAY POWER SUPPLY SYSTEM AND METHOD FOR POWERING AN ELECTRICAL DEVICE SITUATED ALONG A RAILWAY

(75) Inventor: Stefano Orlandi, Florence (IT)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 11/350,063

(22) Filed: Feb. 8, 2006

(65) Prior Publication Data
US 2006/0214067 A1   Sep. 28, 2006

(30) Foreign Application Priority Data
Feb. 8, 2005   (IT) .............................. FI2005A0021

(51) Int. Cl.
*H02J 1/00* (2006.01)
(52) U.S. Cl. ..................................... 307/27; 246/473 R
(58) Field of Classification Search ...................... 307/3, 307/27; 246/479, 473 R
See application file for complete search history.

(56) References Cited

U.S. PATENT DOCUMENTS

| | | | | |
|---|---|---|---|---|
| 1,362,624 | A | * | 12/1920 | Holliday .......................... 307/3 |
| 4,675,579 | A | | 6/1987 | Hardy et al. |
| 4,932,615 | A | | 6/1990 | Frazier et al. |
| 5,094,413 | A | * | 3/1992 | Ripamonti ................. 246/28 F |
| 5,331,288 | A | * | 7/1994 | Darrow ....................... 327/119 |
| 5,669,470 | A | * | 9/1997 | Ross ........................... 191/10 |
| 5,949,659 | A | | 9/1999 | Lesche |
| 6,463,337 | B1 | * | 10/2002 | Walker .......................... 700/4 |
| 6,911,746 | B2 | | 6/2005 | Orr et al. |
| 6,932,624 | B1 | | 8/2005 | Hoopes et al. |
| 2004/0024913 | A1 | * | 2/2004 | Ikeda et al. .................. 709/249 |
| 2004/0047427 | A1 | * | 3/2004 | Dostert et al. ............... 375/260 |
| 2004/0181321 | A1 | * | 9/2004 | Fries et al. .................... 701/19 |

FOREIGN PATENT DOCUMENTS

EP    1338492 A1 *  8/2003

OTHER PUBLICATIONS

Ikuo Watanabe et al., Advanced Automatic Train Protection System, Mar. 1994, IEEE.*

* cited by examiner

*Primary Examiner*—Albert W Paladini
*Assistant Examiner*—Daniel Cavallari
(74) *Attorney, Agent, or Firm*—John Kramer, Esq.; Enrique J. Mora, Esq.; Beusse Wolter Sanks Mora & Maire, P.A.

(57) ABSTRACT

A railway power supply system and method for electrically powering an electrical device are provided. The electrical device is situated along a railway and is powered through an electrically conductive line generally used for carrying an electrical signal to a railway signaling device. The power supply system includes a power injector coupled to the line. The line is used for carrying a signal to the signaling device at a first frequency value for performing a signaling operation. The power injector is configured to introduce at the line a power signal for powering the electrical device. The injected power is at a second frequency value that is sufficiently spread apart from the first frequency value to avoid interference with the signaling operation of the railway signaling device. The power supply system further includes a power collector coupled to the line and to the electrical device for passing the signal for powering the electrical device.

9 Claims, 2 Drawing Sheets

RAILWAY POWER SUPPLY SYSTEM AND METHOD FOR POWERING AN ELECTRICAL DEVICE SITUATED ALONG A RAILWAY

RELATED APPLICATIONS

This application claims priority to Italian Application No. FI 2005 A 000021 filed Feb. 8, 2005, the specification of which is incorporated herein by reference in its entirety.

FIELD OF THE INVENTION

The present invention is generally related to railway electronic equipment, and, more particularly, to a railway power supply system and method for electrically powering at least one electrical device situated along a railway through a line generally used for carrying an electrical signal to a railway signaling device situated along the railway.

BACKGROUND OF THE INVENTION

Electronic devices may be used in railway networks to optimize the control of various parameters associated with railway traffic to raise safety and efficiency standards. One example of electronic devices that are used in railway networks comprises electronic signaling devices, such as semaphores and audiovisual devices, that may be positioned near various electronic control and tracking systems that may part of a railway network, such as wayside equipment.

These systems may exchange data and information with the railway cars in transit —assisting the locomotive operator in carrying out the driving and control operations of the railway cars—and may be able to identify and correct human errors and thus improve the safety level.

The foregoing electronic devices, regardless of functionality and structure, have in common the need to be electrically powered. For example, such devices need to be connected to a voltage source able to supply the appropriate level of current to assure that the appropriate electrical power reaches a given device.

Since these electronic devices are often installed for convenience at the same location or near the signaling equipment, the need to cost-effectively provide the appropriate power level to any such equipment in an integrated fashion is clear. It is known that signaling equipment positioned along the railway line can be relatively far apart from the nearest station (e.g., distances ranging approximately up to a 2200 meters), which raises the issue of providing the appropriate power level to the electronic devices installed along the railway line.

In many installations there are no spare cables available and it becomes problematic to provide additional power lines for new electronic devices. Generally, the power supply circuit from the semaphore signal lamps, near which the electronic devices may be installed, cannot be used. These lamps typically undergo strict inspections to check their efficiency and verify that the necessary current levels are supplied within set intervals. For example, current that may be diverted from the lamps' power supply circuit to supply circuitry apart from the lamps, could conflict with present safety systems by causing conditions, which could be incorrectly declared as alarms, or conversely missing conditions that should result in alarms.

Accordingly, to electrically power such additional electronic devices, it is generally necessary to have a separate power supply line from the one used by the signaling equipment, e.g., a line that drives a semaphore lamp. This commonly requires installing, for each electronic device, a respective set of power cables spanning distances between adjacent stations. This power cabling requirement may be quite costly and time consuming. For example, such installation would require digging along the railway to accommodate these power cables whose combined length could reach up to hundreds of kilometers.

In view of the foregoing, it is desirable to provide a power supply system for the electronic circuitry located along the railway network that doesn't require new cables dedicated to that use, but rather uses existing signaling cables. It is further desirable that such a power supply system be compatible with the already deployed equipment on the railway network and especially with the safety devices and the procedures pertaining to them.

DETAILED DESCRIPTION OF THE INVENTION

Figure 1:
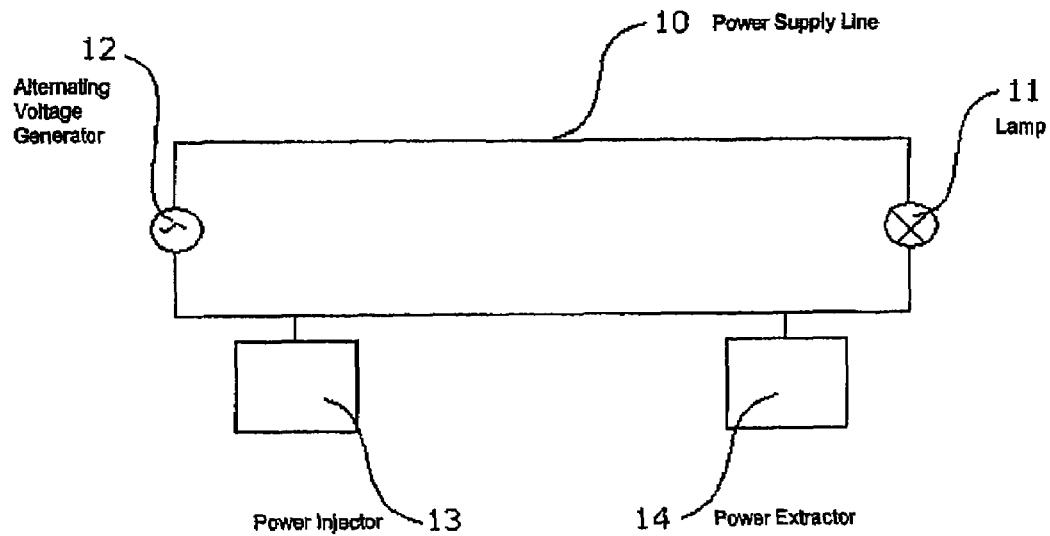
FIG. 1 is a block diagram of a model realization of a power supply system embodying aspects of the present invention, as may be connected to the power supply circuitry of a semaphore signaling lamp.

FIG. 1 is a block diagram of a model realization of a power supply system embodying aspects of the present invention. FIG. 1 illustrates a power supply line (10) of a lamp (11) of a railway semaphore signal, as may be connected to an alternating voltage generator (12).

Power supply line (10) is interconnected with the power supply device according to aspects of the present invention at two locations, one of power injection and one of power extraction, to which a pair of devices (13, 14) that make up the power supply system are respectively connected.

The first of these devices, a power injector device 13, which may be placed at a railroad station, such as at the premises where the warning and protection semaphores of the station are controlled, injects the necessary supply voltage to the power supply line 10. The injected supply voltage is adapted to meet the power requirements of an electronic device (15) (FIG. 2) that needs to be electrically powered without having to install a separate power line. That is, the present inventor has recognized an innovative power supply system that allows utilization of an existing signal-carrying line connected to a first electrical device, e.g., semaphore, to deliver electrical power to a second electrical device.

Figure 2:
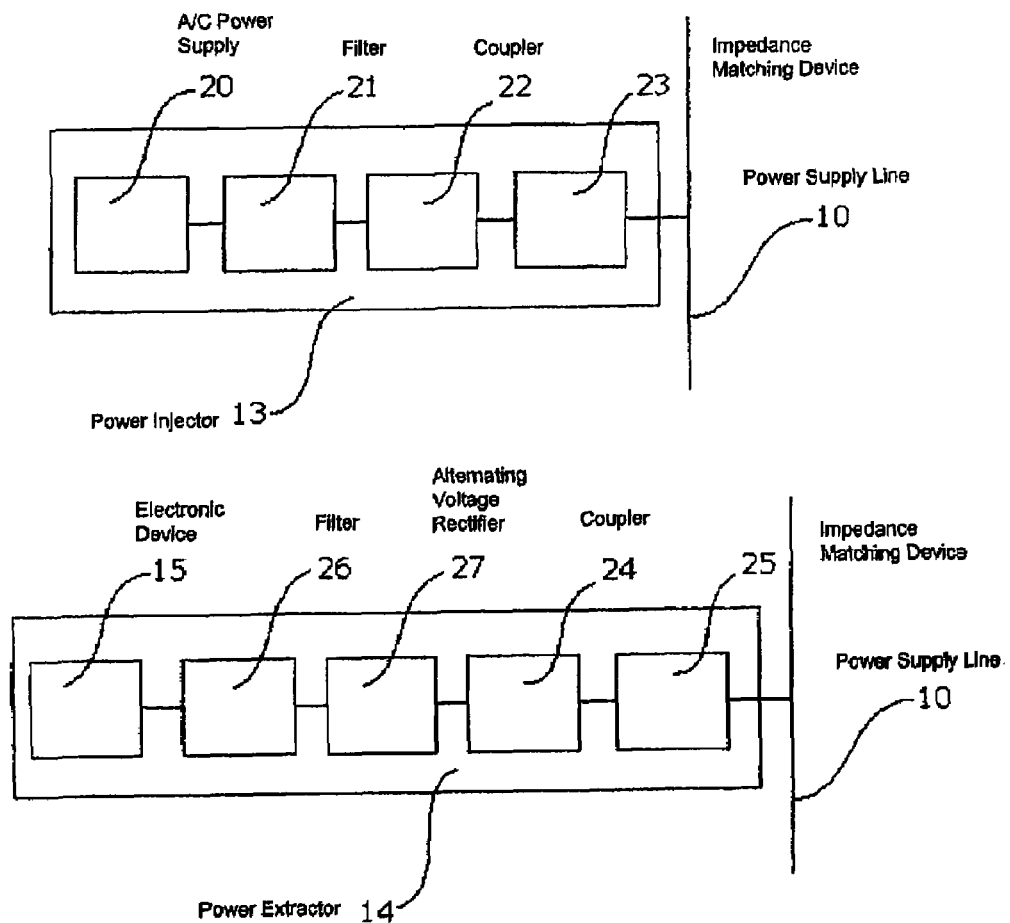
FIG. 2 is a block diagram schematic of a power injector device and a power collector device, as may be used in a power supply system embodying aspects of the present invention.

FIG. 2 illustrates that power injector device (13) may include an ac power supply (20), an optional filter (21), a coupler (22) to the line, and an impedance matching device (23) between the impedance of power supply (20) and the impedance of line (10). FIG. 2 further illustrates a power collector device (14), which may be placed near the semaphore signal along the railway line. Collector device 14 is electrically coupled to the electronic device (15) to be powered through line 10, and includes a coupler (24) to the line, an impedance matching device (25) between the impedance equivalent to the electronic device (15) and the impedance of line (10), an optional filter (26) and an alternating voltage rectifier (27), in case the electronic device (15) needs a continuous voltage (dc voltage).

The power supply circuitry that constitutes the ac power supply (20) in injector device 13 has a switching frequency sufficiently spread apart from the supply frequency so as not to interfere with the semaphore signal lamp power supply (e.g., 60 Hz or 50 Hz) which should remain unaltered.

This switching frequency can be selected, for example, to be in the order of 25 kHz. It will be appreciated that other switching frequency values can be selected without compromising the proper operation of the power supply system.

Figure 3:
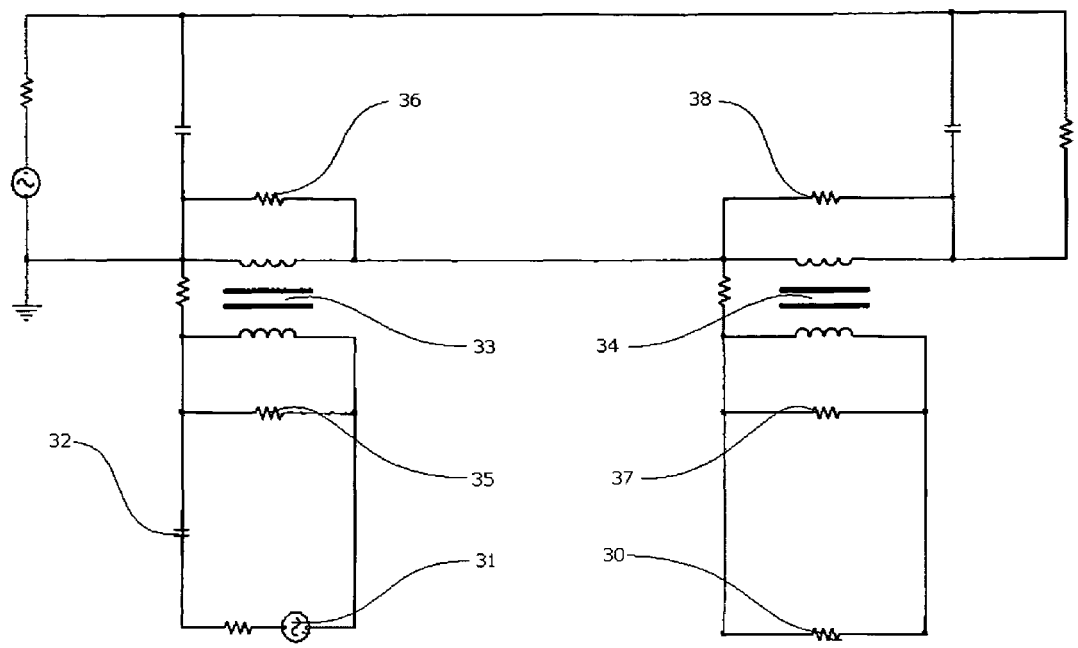
FIG. 3 is a circuit schematic of one exemplary realization of a power supply system embodying aspects of the present invention.

FIG. 3 illustrates an example of the power supply system circuitry according to aspects of the present invention. In this example, the device to be powered is represented by a power resistance (30) while the power supply circuitry (20) includes an alternating voltage generator (31), such as may comprise a switch mode power supply with a working frequency set at approximately 25 kHz, the filter (21) may be constituted by a condenser (32), the couplers (22, 24) to the line (10) may be constituted by transformers (33, 34), the impedance matching devices (23, 25) may be constituted by resistances (35, 36, 37, 38) placed parallel with respect to the primary and secondary winding of these transformers.

This power supply system circuitry is configured to ensure electrical continuity of the original line, maintain unaltered the power supply circuitry of the first electrical device, e.g., a semaphore signal lamp, and the protection and alarms systems connected to it.

An appropriate default should be exercised in the event the power supply system device is to be connected to a line pertaining to a semaphore signal for a red lamp. This way if there were to be a malfunction of the power supply system device, which by default would be able to control the lighting of the red lamp, the red signal condition that would follow would be a restricted condition and hence safe for railway traffic. In this same scenario, if the failure condition were to result in the interruption of the lamp power supply, this would lead to a restrictive condition equivalent to the presence of a red signal. In the eventuality that a hypothetical failure of the power supply system according to aspects of the present invention were to result in a reduced oscillation frequency of the power supply, for example, proximate to a point of interfering with the supply frequency of the semaphore signal lamp, the transformer cores (33, 34), such as made of ferrite and being electromagnetically coupled to the line (10) would become saturated, thus disabling the signal transmission to the secondary side of the transformer, and consequently avoiding interference with the lamp's power supply circuitry.

What is claimed is:

1. A railway power supply system for electrically powering at least one electrical device situated along a railway, said powering to be performed through an electrically conductive line connecting a railway signaling device power source to a railway signaling device situated along the railway, wherein the railway signal device power source provides power to the railway signaling device at a first frequency value, said power supply system comprising:
a power injector coupled to the electrically conductive line, said power injector configured to generate and introduce electric device power to the electrically conductive line at a first point of the electrically conductive line for powering the at least one electrical device, the electric device power configured to generate electric device power at a second frequency value sufficiently spread apart from said first frequency value to avoid interference with the operation of the railway signaling device; and
a power collector coupled at a second point of the electrically conductive line and to the at least one electrical device and configured to provide a path between the electrically conductive line and the at least one electric device for the electric device power injected by the power injector.

2. The railway power supply system of claim 1 wherein said power injector comprises an alternating current (ac) power supply, a coupler for coupling said ac power supply to the electrically conducting line, and an impedance matching device configured to match an impedance of the alternating current (ac) power supply to an impedance of the electrically conductive line, the impedance matching device coupled between the power supply and the line.

3. The railway power supply system of claim 2 wherein the ac power supply comprises a switching-mode power supply.

4. The railway power supply system of claim 3 wherein an oscillation frequency value of said switching-mode power supply is above 10 kHz.

5. The railway power supply system of claim 1 wherein said power collector comprises a coupler for coupling the at least one electrical device to the line, and an impedance matching device configured to match an impedance equivalent of the electric device to an impedance of the electrically conductive line, the impedance matching device coupled between the at least one electrical device and the electrically conductive line.

6. The railway power supply system of claim 1 wherein the coupler in the power injector comprises a transformer arranged to provide a galvanic connection between the power supply and the electrically conductive line.

7. The railway power supply system of claim 6 wherein the coupler in the power collector comprises a transformer arranged to provide a galvanic connection between the at least one electrical device and the electrically conductive line.

8. The railway power supply system of claim 1 wherein a distance from the first point at the electrically conductive line to the second point at the electrically conductive line comprises a range of 0 meters to 2200 meters.

9. A method for electrically powering at least one electrical device situated along a railway through an electrically conductive line connecting a railway signaling device power source to a railway signaling device, wherein the railway signaling device power source provides power to the signaling device at a first frequency. said method comprising:
injecting electric device power at a first point of the electrically conductive line, wherein the electric device power is configured to power the at least one electrical device and to be at a second frequency value sufficiently spread apart from said first frequency value to avoid interference with the operation of the signaling device;
collecting at a second point of the electrically conductive line the electric device power that was injected at the first point of the electrically conductive line; and
passing to the at least one electrical device the electric device power collected at the second point of the line.

* * * * *